US010783446B1

United States Patent
Burchard

(10) Patent No.: US 10,783,446 B1
(45) Date of Patent: Sep. 22, 2020

(54) QUANTUM SOLVER FOR FINANCIAL CALCULATIONS

(71) Applicant: Goldman, Sachs & Co., New York, NY (US)

(72) Inventor: Paul H. Burchard, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 800 days.

(21) Appl. No.: 14/592,876

(22) Filed: Jan. 8, 2015

Related U.S. Application Data

(60) Provisional application No. 61/925,051, filed on Jan. 8, 2014.

(51) Int. Cl.
*G06N 10/00* (2019.01)
*G06N 20/00* (2019.01)

(52) U.S. Cl.
CPC .............. *G06N 10/00* (2019.01); *G06N 20/00* (2019.01)

(58) Field of Classification Search
CPC .... G06N 99/005; G06N 99/002; G06N 10/00; G06N 20/00
See application file for complete search history.

(56) References Cited

U.S. PATENT DOCUMENTS

| 7,113,967 | B2 | 9/2006 | Cleve |
| 2005/0133780 | A1 | 6/2005 | Azuma |
| 2008/0140749 | A1 | 6/2008 | Amato et al. |
| 2009/0164435 | A1 | 6/2009 | Routt |
| 2015/0081565 | A1* | 3/2015 | Roullier ............. G06Q 30/0242 705/64 |
| 2017/0364796 | A1 | 12/2017 | Wiebe et al. |

OTHER PUBLICATIONS

Abrams, Daniel S., and Seth Lloyd. "Nonlinear quantum mechanics implies polynomial-time solution for NP-complete and# P problems." Physical Review Letters 81.18 (1998): 3992.*
Aaronson, Scott. "Guest column: NP-complete problems and physical reality." ACM Sigact News 36.1 (2005): 30-52.*
Valiant, Leslie G., and Vijay V. Vazirani. "NP is as easy as detecting unique solutions." Theoretical Computer Science 47 (1986): 85-93.*

(Continued)

*Primary Examiner* — Vincent Gonzales
*Assistant Examiner* — Kevin W Figueroa

(57) ABSTRACT

A system and method for solving general classes of difficult financial calculations such as capital calculations and pricing calculations on a quantum computer are disclosed. In some embodiments, the disclosed method reduces financial problems to problems in # P. In some embodiments, the method includes constructing a quantum circuit whose ground states are comprised of solutions to an associated NP problem that the problem in # P is counting, and then using a quantum annealing process to find one of those ground states, if it exists. For the gross estimate of the size of the solution set of the NP problem, which the # P problem is counting, the method includes finding one solution that achieves a specific random hash value, applying a correction formula, and amplifying the result using a k-fold iterated hash function, in which the number of bits of the hash value increases linearly with each iteration.

36 Claims, 10 Drawing Sheets

(56) References Cited

OTHER PUBLICATIONS

Bernstein, Daniel J. "Cost analysis of hash collisions: Will quantum computers make SHARCS obsolete." SHARCS'09 Special-purpose Hardware for Attacking Cryptographic Systems (2009): 105.*
Fischlin, Marc, and Anja Lehmann. "Security-amplifying combiners for collision-resistant hash functions." Annual International Cryptology Conference. Springer, Berlin, Heidelberg, 2007. (Year: 2007).*
Gligoroski, Danilo, Smile Markovski, and Svein J. Knapskog. "A secure hash algorithm with only 8 folded sha-1 steps." International Journal of 194 Computer Science and Network Security 6.10 (2006): 194-205. (Year: 2006).*
Kutzkov, Konstantin, "New upper bound for the #3-SAT Problem", Science Direct, Nov. 18, 2006, 5 pages.
Stockmeyer, Larry,"On Approximation Algorithms for #P*," Siam Journal on Computing, 14(4), Nov. 1985, pp. 1-13.
Applebaum, Benny, et al., "Low-Complexity Cryptographic Hash Functions," 8th Innovations in Theoretical Computer Science (ITCS), 2017, 31 pages.
Brassard Gilles, et al., "Quantum Counting," arXiv.org, arXiv:quant-ph/9805082v1, May 27, 1998, 12 pages.
Ermon, Stefano, et al., "Optimization with Parity Constraints: From Binary Codes to Discrete Integration," Supported in part by NSF Grant 0832782, 10 pages.
Nachtergaele, Bruno, "Quantum Spin Systems," arXiv.org, arXiv:math-ph/0409006v1, Sep. 2, 2004, 10 pages.
Rotteler, Martin, et al., "A quantum circuit to find discrete logarithms on ordinary binary elliptic curves in depth O(log2n)," arXiv.org, arXiv:1306.1161v2 [quant-ph], Nov. 14, 2013, 13 pages.
Shaltiel, Ronen, et al., "Pseudorandomness for Approximate Counting and Sampling," Electronic Colloquium on Computational Complexity, Report No. 86, 2004, ISSN 1433-8092, 24 pages.
Rjlipton, "Stockmeyer's Approximate Counting Method," Gödel's Lost Letter and P=NP blog post, Aug. 27, 2009, 11 pages.
Thompson, Jayne, et al., "Quantum computing with black-box subroutines," arXiv.org, arXiv:1310.2927v5 [quant-ph], Nov. 21, 2013, 8 pages.
Florio et al., "Quantum Implementation of Elementary Arithmetic Operations"; https://arxiv.org/abs/quant-ph/0403048; submitted on Mar. 5, 2004; 11 pages.

Grover et al., "Is Partial Quantum Search of a Database Any Easier?"; https://arxiv.org/abs/quant-ph/0407122v4; submitted on Feb. 7, 2005; 15 pages.
Hoyer et al., "Lower Bounds on Quantum Query Complexity"; https://arxiv.org/abs/quant-ph/0509153v1; submitted on Sep. 21, 2005; 23 pages.
Montanaro, "Quantum speedup of Monte Carlo methods", The Royal Society Publishing, May 2015, 20 pages.
Heinrich, "Quantum Summation with an Application to Integration", May 2001, 48 pages.
Boyer et al., "Tight bounds on quantum searching", PhysComp96, May 1996, 8 pages.
Diao et al., "Quantum Counting: Algorithm and Error Distribution", Acta Applicandae Mathematicae, vol. 118, No. 1, Feb. 2012, pp. 147-159.
Liu et al., "A Parallel Quantum Algorithm for the Satisfiability Problem", Communications in Theoretical Physics, vol. 49, No. 3, Mar. 2008, pp. 629-630.
Long et al. "Search an unsorted database with quantum mechanics", Frontiers of Computer Science In China, vol. 1, No. 3, Jul. 2007, pp. 247-271.
Long, "Grover Algorithm with zero theoretical failure rate", Cornell University Library, Jun. 2001, 5 pages.
International Search Report dated May 22, 2019 in connection with International Patent Application No. PCT/US2019/017974, 4 pages.
Written Opinion of the International Searching Authority dated May 22, 2019 in connection with International Patent Application No. PCT/US2019/017974, 10 pages.
Hasegawa et al., "Theoretical Analyses of Quantum Counting against Decoherence Errors", Mar. 2005, 22 pages.
Brassard et al., "An optimal quantum algorithm to approximate the mean and its application for approximating the median of a set of points over an arbitrary distance", May 2011, 10 pages.
Montanaro, "Quantum speedup of Monte Carlo methods", Jul. 2017, 28 pages.
Brassard et al., "Quantum Amplitude Amplification and Estimation", May 2000, 32 pages.
Grover et al., "Quantum search for multiple items using parallel queries", arXiv:quant-ph/0407217v1, Jul. 2004, 6 pages.
Zalka, "Grover's quantum searching algorithm is optimal", arXiv:quant-ph19711070v2, Dec. 1999, 13 pages.
Office Action dated Aug. 3, 2020 in connection with U.S. Appl. No. 15/699,669, 48 pages.
Office Action dated Aug. 3, 2020 in connection with U.S. Appl. No. 16/275,618, 27 pages.

* cited by examiner

QUANTUM SOLVER FOR FINANCIAL CALCULATIONS

CROSS-REFERENCE TO RELATED APPLICATION(S)

This application claims priority to and benefit from U.S. Provisional Patent Application Ser. No. 61/925,051, entitled "Quantum Solver For Financial Calculations" filed on Jan. 8, 2014. The entire content of the above identified application is incorporated by reference herein.

BACKGROUND

A quantum computer is a computation device that uses quantum mechanics. Quantum computing exploits quantum mechanical phenomena such as superposition and entanglement to perform operations on data. A quantum computer is different from a classical computer. A classical computer is a two-state system, characterized by bits (0 or 1). A quantum computer, on the other hand, can exist in a superposition of states. The building block of a quantum computer is a quantum bit or qubit. Thus, each qubit can represent 1, 0 or any superposition of the two states. In general, an n-qubit quantum computer can exist in any superposition of $2^n$ states simultaneously, while a n-bit classical computer can be in only one of the $2^n$ states.

Complexity theory is a quantitative study of the amount of computational resources required to solve important computational problems and to classify the problems according to their difficulty. Complexity theory classifies computational problems into complexity classes. Generally, a complexity class is defined by a computation model, resource(s) and the complexity bound for each resource. The complexity classes of decision problems include:

1. P: By definition, P contains all problems that can be solved by deterministic programs of reasonable worst-case time complexity. Examples of problems in this class include finding a shortest path in a network, sorting, etc.
2. NP ("Non-deterministic Polynomial time"): NP includes a class of problems whose solutions can be verified quickly by a deterministic machine in polynomial time.
3. NP-hard: A problem is NP-hard if an algorithm for solving it can be translated into one for solving any NP problem.
4. NP-complete: NP-complete is a subset of NP. A problem is NP-complete if solutions to that problem can be verified quickly and an algorithm to solve the problem can be used to solve all other NP problems. One specific NP-complete problem is 3-SAT, which is the problem of finding Boolean variables to satisfy a formula which "ANDs" (logical operation) together a list of clauses, each of which is a logical operation "OR" of exactly 3 variables or their negations. For example:
$(x_1 \lor \bar{x}_2 \lor x_4) \land (x_2 \lor x_5 \lor \bar{x}_6) \land (\bar{x}_1 \lor x_3 \lor \bar{x}_5) \land (x_2 \lor \bar{x}_3 \lor \bar{x}_6)$
5. Class # P includes problems that count the number of solutions to a decision problem in the class NP. This class is clearly at least as difficult to solve as NP, and conjecturally harder.

It is possible to solve for 3-SAT problems using a quantum computer. As shown in FIG. 1, the 3-SAT problem has a "phase transition" at 4.24 clauses per variable. Random problems with less than 4.24 clauses per variable are easy because they almost certainly have lots of solutions, while random problems with more than 4.24 problems are easy because they almost certainly have no solutions to find. Here the energy is the number of unsatisfied clauses.

For hard 3-SAT instances, with 4.24 clauses per variable, the distribution of energy among states is approximately binomial, as shown in FIG. 2. Thus, solutions (states with E=0) barely exist, while the most common energy is E=N/2.

To understand the shape of the energy surface, the number of connected components C of the set of states with energy≤E (where connection is by single bit flip) is counted. This depends primarily on the ratio N/E. As problem instances are randomly sampled, as shown in FIGS. 3A and 3B, the distribution of the number of connected components follows the best fit formula:

$$\frac{4.75}{(N/E)} \sqrt{C} \, e^{-C^2/(N/E-2)}$$

Thus, the typical number of connected components $C \sim \sqrt{N/E-4}$. This behavior paints a picture of a fractal energy function. Each time energy is reduced by a factor of 4, the basins of energy≤E split into two. The two new split basins are not far apart; the typical separation is just one hop. For example, FIG. 3C shows a distribution of distance between each connected component and its closest neighbor. Note this fractal behavior occurs only at the phase transition. With a smaller number of clauses, there is generally just one component, and with larger, zero.

To minimize this fractal energy by quantum annealing, a logarithmic number of steps can be taken, which effectively decreases the expected energy E of the system by factors of 4 each time. The most optimistic interpretation of the fractal structure of the energy function is that the barrier between the most separated basins at energy E is no worse than the plot shown in FIG. 3D which can height N/E and width $\log_4(N/E)$. Using the semi-classical approximation (since this is adiabatic, not dynamic), the quantum tunneling time for this barrier is approximately $\exp(c\sqrt{N/E} \log_4(N/E))$, which is sub-exponential but super-polynomial, which is an advance over classical computing.

In quantum annealing systems, such as those based on Ising spin systems, energy function is typically implemented in quadratic form. It is thus possible to encode the relationship z=F(x, y) where F is any binary logic function as a quadratic energy in x, y, z, which is zero when the relationship holds. The non-zero values are either 1 or 3. Table 1 below shows some examples.

TABLE 1

| x y z | AND | OR | NOR | NOT |
|---|---|---|---|---|
| | xy − 2z(x + y) + 3z | xy − 2z(x + y) + (x + y + z) | xy + 2z * (x + y) − (x + y + z) + 1 | 2xz − (x + z) + 1 |
| 0 0 0 | 0 | 0 | 1 | 1 |
| 0 0 1 | 3 | 1 | 0 | 0 |
| 0 1 0 | 0 | 1 | 0 | 1 |
| 0 1 1 | 1 | 0 | 1 | 0 |
| 1 0 0 | 0 | 1 | 0 | 0 |
| 1 0 1 | 1 | 0 | 1 | 1 |
| 1 1 0 | 1 | 3 | 0 | 0 |
| 1 1 1 | 0 | 0 | 3 | 1 |

Given that binary logic functions can be encoded as quadratic energies, the satisfaction of each clause can be encoded using just two auxiliary qubits, as shown in FIG. 4. Adding up energy across all clauses, the quantum circuit exactly reproduces the energy. For example, $x_1 \lor \bar{x}_2 \lor x_4$.

SUMMARY

A method and system for solving problems in # P, including financial problems, using a quantum computer are disclosed. Solving these problems would not be feasible or practical using classical computer systems. In some embodiments, a method of solving a problem in # P class on a quantum circuit comprises counting a number of solutions to an associated problem in NP class. Counting the number of solutions to the associated problem in NP class includes constructing a quantum circuit having ground states that comprise of a set of candidate solutions to the associated problem in the NP class, and using a quantum annealing process to find one of the ground states, if it exists, as a solution to the associated problem in the NP class.

In some embodiments, a method of solving a problem in # P class using a quantum computer comprises determining a gross estimate of a number of solutions to a problem in an NP class that the problem in the # P class is counting. The gross estimate can be determined by identifying solutions that achieve specific hash values. The method also comprises amplifying the gross estimate of the number of solutions using an iterated hash function, and providing the amplified gross estimate as a solution to the problem in the # P class.

DETAILED DESCRIPTION

Figure 1:
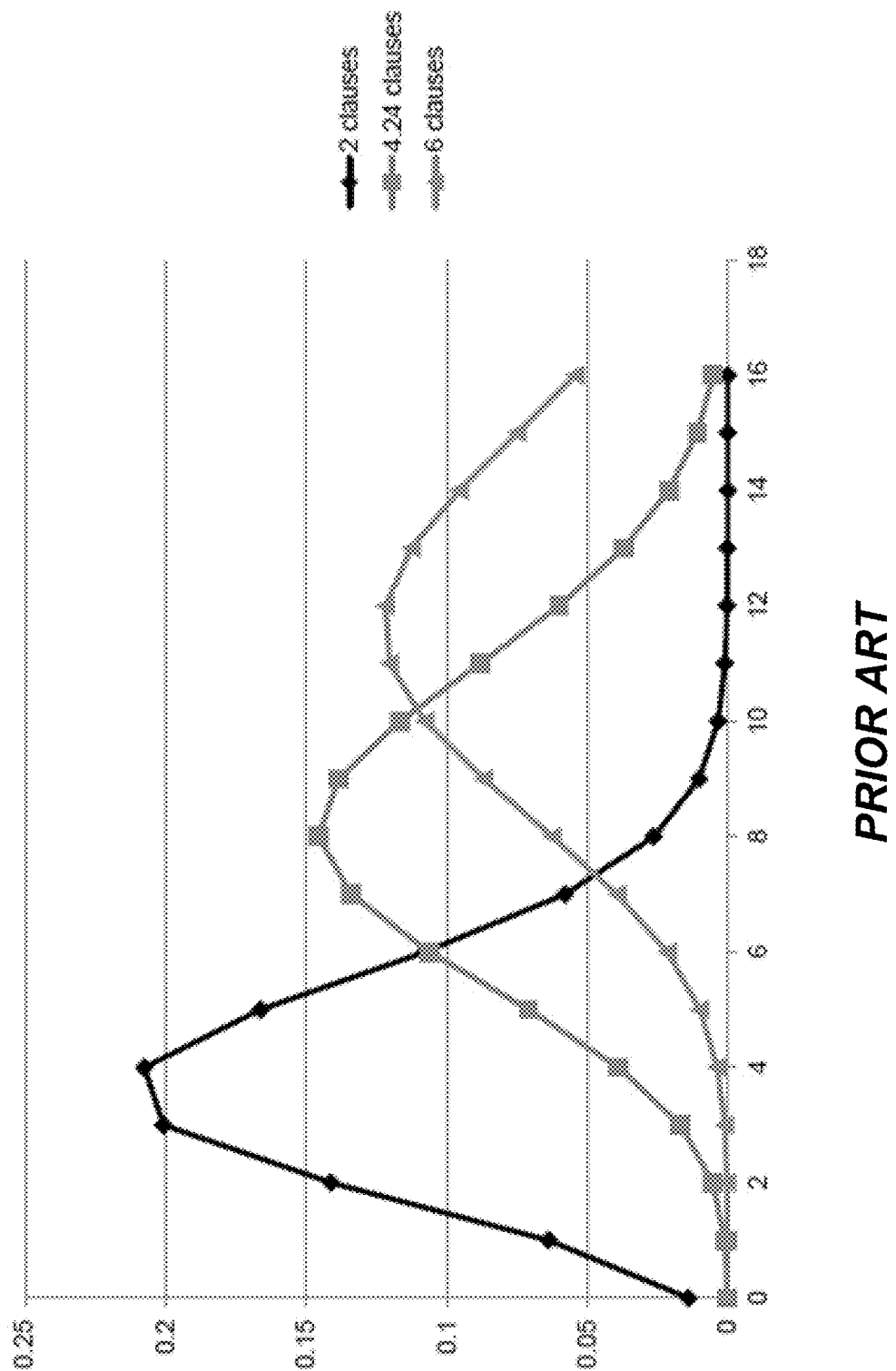
FIGS. 1 and 2 are graphical diagram illustrating distribution of energy in the 3-SAT problem.
Figure 2:
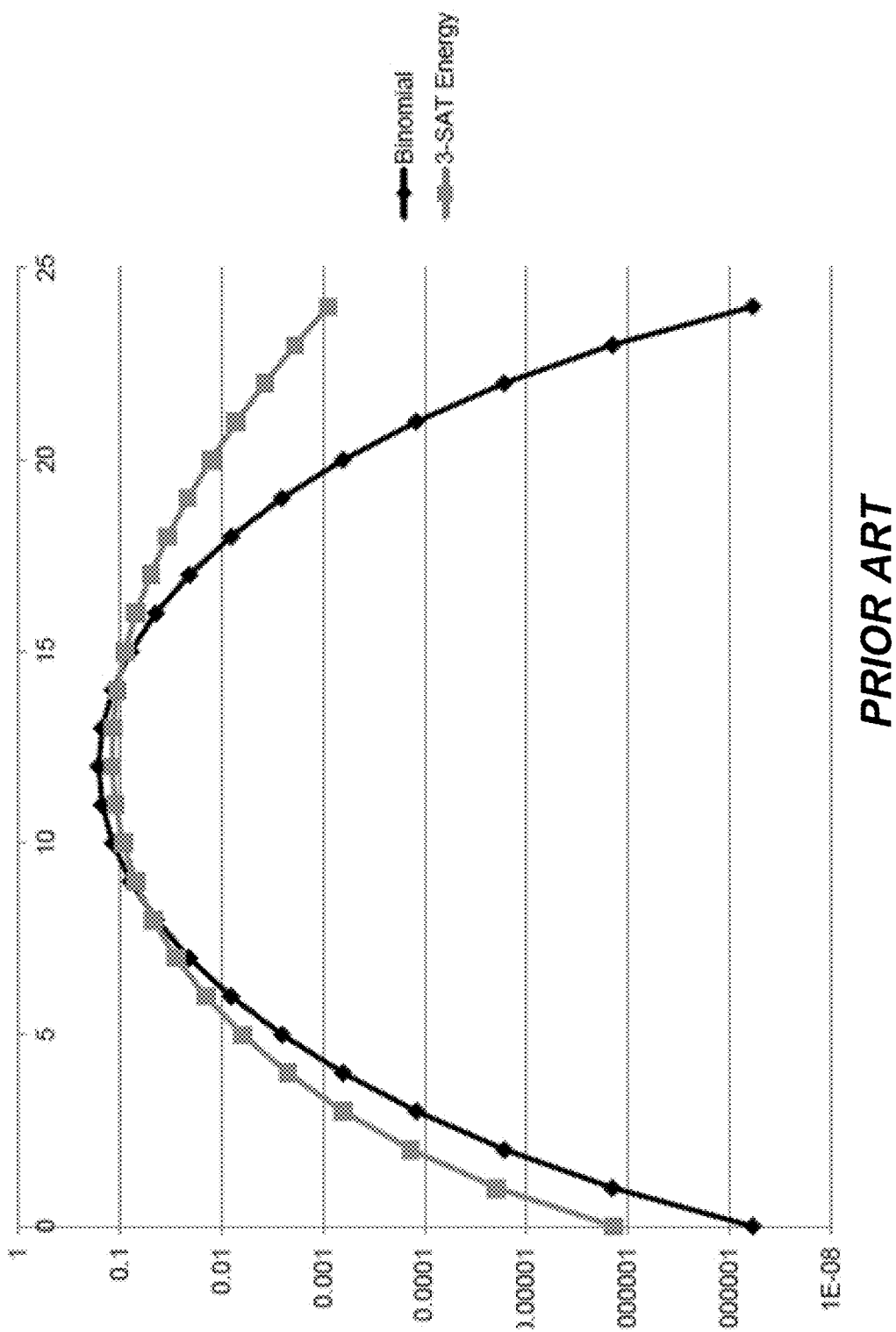
Figure 3A:
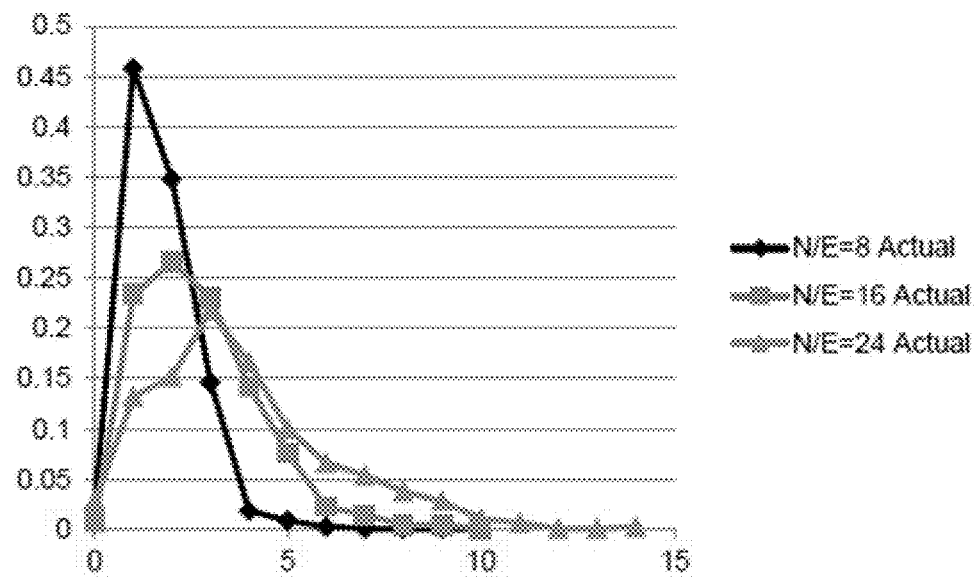
FIGS. 3A-3B are graphical diagram illustrating shape of energy surface using actual and fitted data respectively.
Figure 3B:
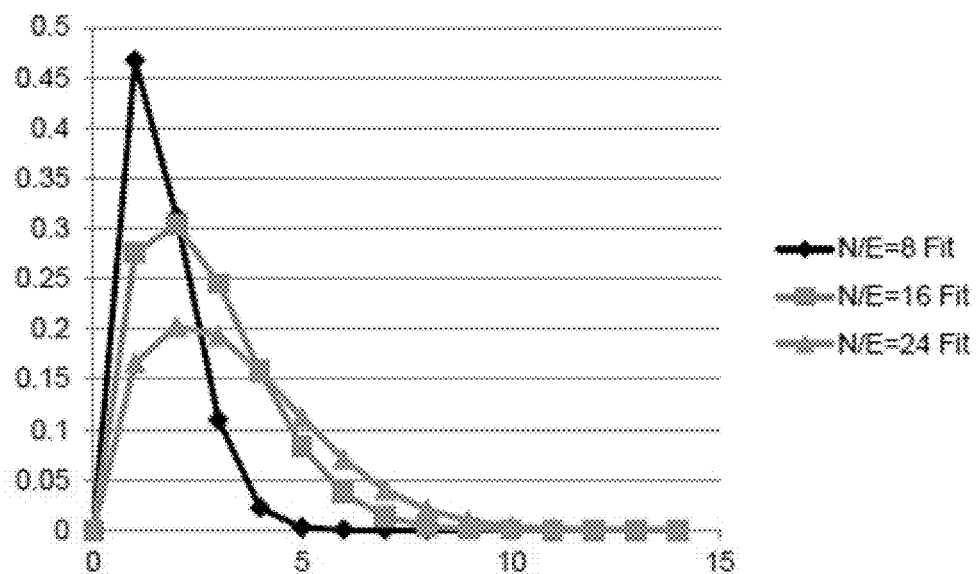
Figure 3C:
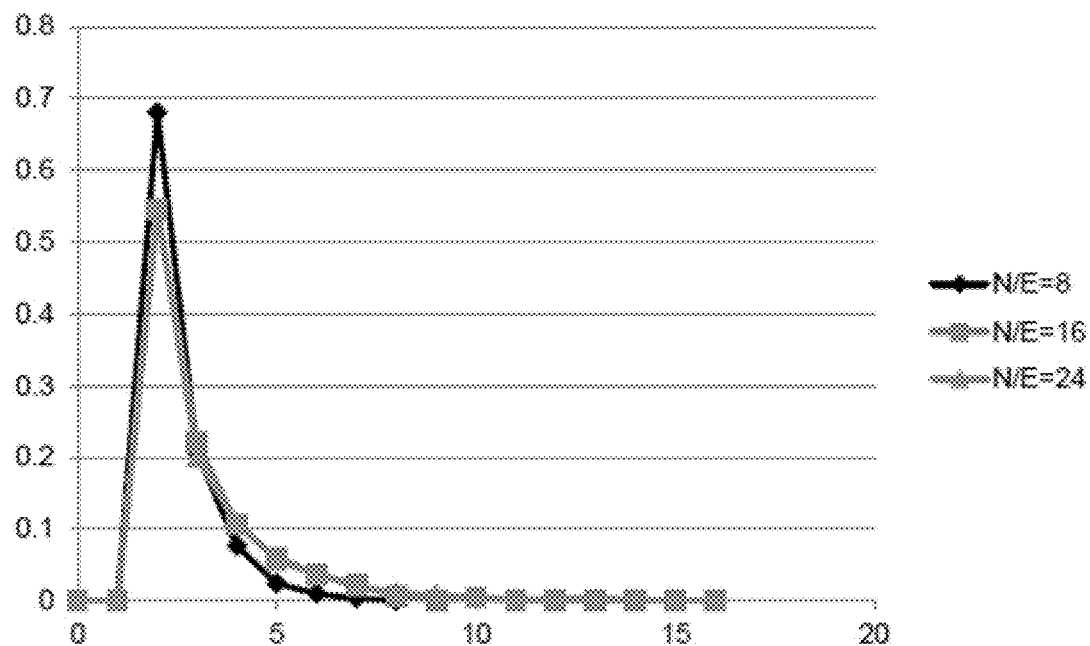
FIGS. 3C and 3D are graphical diagrams illustrating fractal energy functions.
Figure 3D:
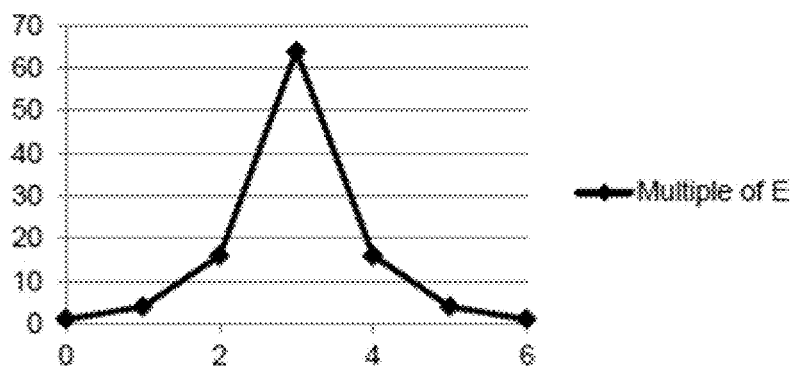
Figure 4:
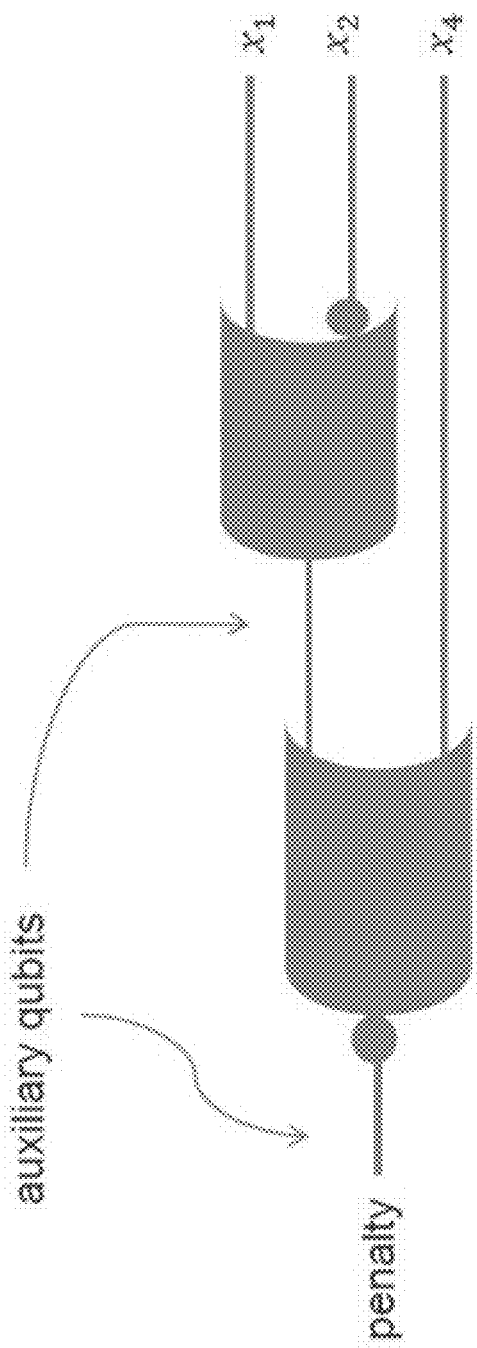
FIG. 4 is a diagram illustrating a quantum circuit encoding a logic function.

A solver implemented on a quantum computing hardware that can solve various classes of difficult problems in # P (the symbol "#" is referred to herein as "sharp" or "number") (hereinafter "quantum solver") is disclosed. The quantum solver would make feasible or faster computationally complex calculations that were not practically possible before, using classical computer systems. Classical computer systems generally require exponential time to solve NP-complete problems, and an even greater exponential time (i.e., with a larger exponent) for # P problems. The exponential time cost effectively creates a hard barrier on the largest problem size that can be solved. A quantum computer, due to tunneling, can solve such problems in $\exp(c\sqrt{N})$ time. Consequently, the quantum solver disclosed herein can solve much larger problem sizes that cannot be practically solved using a classical computer system. In some embodiments, the quantum solver can be encoded into a quantum circuit (or quantum computer chip or quantum processor) having N qubits by encoding logic functions as quadratic energies. The quantum solver can then use a quantum annealing method to solve # P-complete problems. Quantum annealing is a computation method that can be used to find a low energy state (e.g., ground state) of a quantum circuit which encode solutions to an NP problem that the # P problem is counting.

Existing algorithms for solving some problems may require more computational resources than what a single quantum computing chip can provide. However, currently there is no way to quantum mechanically couple multiple quantum computing chips and retain superposition of quantum states across multiple chips. The quantum solver disclosed herein overcomes this disadvantage by using an iterated hashing technique. Using the iterated hashing technique, the quantum solver can achieve, using a single quantum computing chip, quantum acceleration for problems that normally require the computational resources of multiple quantum computing chips. This solution can thus not only solve # P problems, but can do so in an efficient manner using fewer quantum computing chips than normally required.

The quantum solver has many applications. In some embodiments, the quantum solver can be used for solving difficult financial calculations, e.g., pricing and capital calculations. In some embodiments, the quantum solver can solve the following three general classes of difficult finance calculations that can be translated into the solution of a problem of class # P:

(1) Capital calculations: Over exponentially many scenarios x, find the $p_{th}$ percentile gain or loss f(x).
(2) Pricing calculations: Over exponentially many scenarios x, find the average discounted payoff f(x).
(3) American Pricing calculations: Over exponentially many scenarios $x=(x_1, \ldots, x_n)$, find the expected payoff p( ) where inductively, $$p(x_1, \ldots, x_k) = f(x_1, \ldots, x_k; \text{average}_{\{x_{\{k+1\}}\}} p(x_1, \ldots, x_{\{k+1\}})) \text{ for some } f.$$

As noted above, the financial calculations (1)-(3) are in the complexity class # P. The quantum solver actually solves all # P problems and handles these financial calculations as a special case. In some embodiments, the financial problems can be formulated into problems in # P using various techniques to enable the quantum solver to solve an associated problem in NP. For example, for the problem class (1) above, the financial problem can be reduced to a problem of counting x such that f(x)<c, and the existence of such x is clearly in NP.

Similarly, for the problem class (2) above, the quantum solver can turn the computation of the average of f(x) into a problem in # P by scaling and translation. For example, one can assume without loss of generality that f(x) takes values in non-negative integers y with d bits (enough for the desired accuracy). Up to further scaling, the average to be computed is the sum of this f(x) over all x. But this sum amounts to counting the solutions to the following decision problem in NP: consider strings (x, y) of N+d bits, and declare such an (x, y) to be a solution, if y<f(x).

For problem class (3) above, similar to the method of Longstaff-Schwartz used in Monte Carlo methods, the conditional average $a(x_1, \ldots, x_k) = \text{average}_{\{x_{\{k+1\}}\}} p(x_1, \ldots, x_{\{k\pm1\}})$ is represented as the least squares best fit of some chosen functional forms, $a(x_1, \ldots, x_k) = \Sigma_i c_i p_i(x_1, \ldots, x_k)$, resulting in the inductive conclusion that $p(x_1, \ldots, x_k) = f(x_1, \ldots, x_k; \Sigma_i c_i p_i(x_1, \ldots, x_k))$ once the $c_i$ have been determined. To determine the $c_i$, the solution of the least squares best fit involves the calculation of the averages of the functions $p(x_1, \ldots, x_{\{k+1\}}) p_i(x_1, \ldots, x_k)$ and $p_i(x_1, \ldots, x_k) p_j(x_1, \ldots, x_k)$ over all truncated scenarios $(x_1, \ldots, x_{\{k \pm i\}})$. These function averages are computed in #P exactly as in problem class (2) above.

The best known algorithm for a classical computer to solve the #P-complete problem "#3SAT" takes time proportional to: $10^{(0.215 \cdot N)}$. Based on the fact that quantum tunneling transmission rates decay only as $\exp(\sqrt{U})$, where U is barrier height, while classical thermal transmission rates are exponential as $\exp(U)$, it may be possible to solve #P-complete problems using the disclosed quantum solver in time proportional to $10^{C\sqrt{N}}$ instead, for some constant C. This is based on using quantum tunneling to find solutions to NP problems in such an accelerated time, and then using novel hashing methods to reduce the #P problem to a number of NP problems that can practically fit on the quantum hardware. Thus, the quantum solver can make the task of finding a solution to hard problems feasible and/or faster.

Existing classical methods for using an NP-oracle to solve for #P problems are based on finding hash collisions between solutions, and amplifying by applying a monolithic hash function to a product of such problems. However, because there is currently no way to quantum mechanically couple multiple quantum computing chips, the quantum solver makes the best available use of the finite size of the actual quantum chip. The quantum solver does that by looking for hash hits instead of hash collisions, and amplifying by means of iterated hash functions instead of monolithic hash functions.

P is clearly at least as hard as NP, conjecturally harder—even approximately (for a subset of #P-complete problems). However, an NP "oracle" can be used to probabilistically and approximately solve #P problems in polynomial additional work. The NP oracle can be used to look for hash collisions between solutions. This provides a gross estimate of the size of the solution set; which can then be amplified by applying the same technique to the product of k copies of the problem.

The quantum solver disclosed herein makes several changes and improvements to the above approach of using NP oracle to optimize for quantum computing. Currently there is no way to quantum mechanically couple multiple quantum computing chips that retains superposition of quantum state across multiple chips. Consequently, the entire quantum algorithm must fit onto a single chip, which makes quantum circuit size the binding constraint. The quantum solver disclosed herein can achieve quantum acceleration even for problems where the existing algorithm would require computational resources larger than a single chip by using a method based on iterated hashing.

Instead of a hypothetical NP "oracle," a quantum computer based on the mechanism of quantum annealing (note that a quantum computer based on other models may also be used) is used herein to solve NP problems in less time than a classical computer can. The solution is achieved by constructing a quantum circuit whose ground states comprise solutions to the NP problem, and then using the quantum annealing process to find one of those ground states, if it exists. Based on the fact that the quantum tunneling transmission rate goes as $\exp(\sqrt{U})$, where U is the barrier height, as opposed to the classical thermal transmission rate of $\exp(U)$, it can be inferred that such a quantum computer can potentially solve NP problems of size N in time proportional to $\exp(C\sqrt{N})$, instead of what is believed to be the best classical solution time of $\exp(C \cdot N)$.

For the gross estimate of solution set size, instead of hash collisions between two solutions, the quantum solver finds one solution that achieves a specific random hash value, also adding random salt into the hash function. This makes more efficient use of the constrained circuit size because the probability of a non-hit in this approach is ~

$$\exp\left(-\frac{n}{m}\right)$$

while in the collision approach it would be $$\sim \exp\left(-\frac{n^2}{m}\right),$$

where n is the actual size of the solution set and m is the number of distinct hash values. The hash hit value in $\{0,1\}$ can be averaged over a small number of samples to get the desired O(1) bound on the estimate of the actual probability of being a solution.

Instead of assuming that the number of distinct hash values is much smaller than the set of all possible problem inputs, as the classical proof does, an assumption can be made that m and n are comparable, to get the most dynamic resolution from a hit or non-hit of the hash value. This requires a correction term to the sample probability when n gets close to m (see plots shown in FIGS. 5-7). The approximate formula that fits the simulations is that the probability q of an iterated hash hit is given in terms of the actual probability p of being a solution by:

$$q = p - \left(1 - \left(\frac{2}{\pi}\right)^k p^{\left(\frac{1.5}{k^{0.2}}\right)}\right)$$

For the amplification, instead of using a monolithic hash function on a product of k potential solutions, a k-fold iterated hash function, in which the number of bits of the hash value increases linearly with each iteration is used (specifically, using m times as many possible hash values on each iteration). This has the same probabilities as the monolithic hash function, but can be solved iteratively by decoding one solution at a time along with a candidate input iterative hash value. This allows k-fold amplification to be performed in only logarithmic quantum circuit size and linear time in k, instead of linear quantum circuit size in k. Note that the key point of the amplification step—as opposed to just using multiple samples of 1-fold hash hit—is that the estimation error goes down linearly in the number of iterations, instead of as a square root in the number of samples (as would be typical for a Monte Carlo approach).

Figure 5:
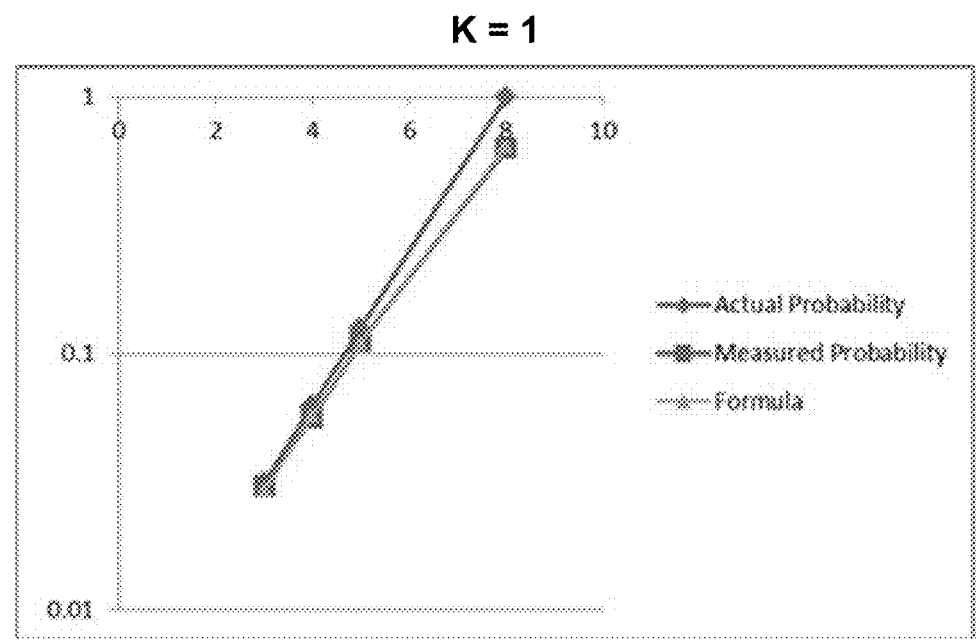
FIGS. 5-7 are graphical diagrams illustrating simulation results for verifying the correction formula used in solving NP problems.
Figure 6:
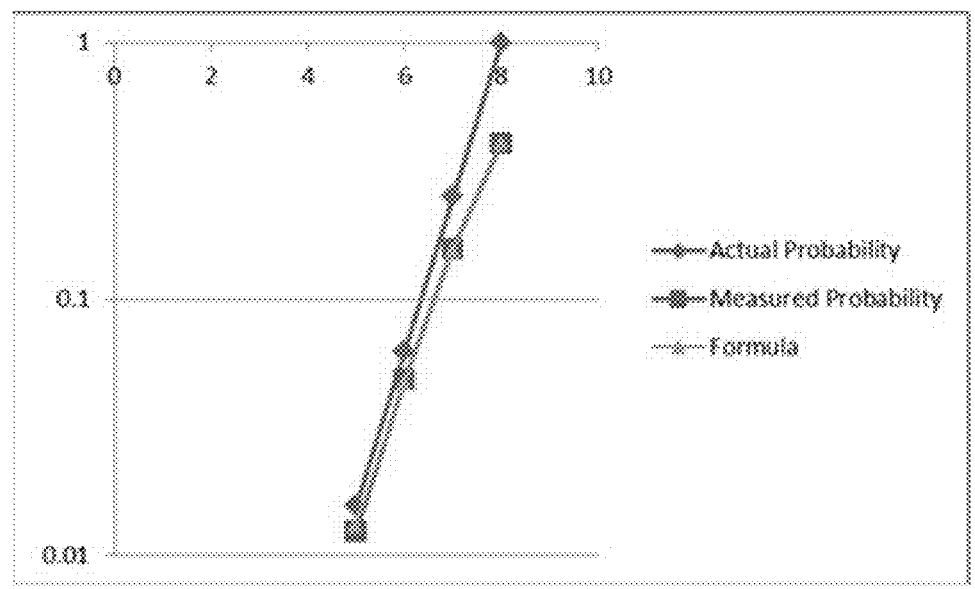
Figure 7:
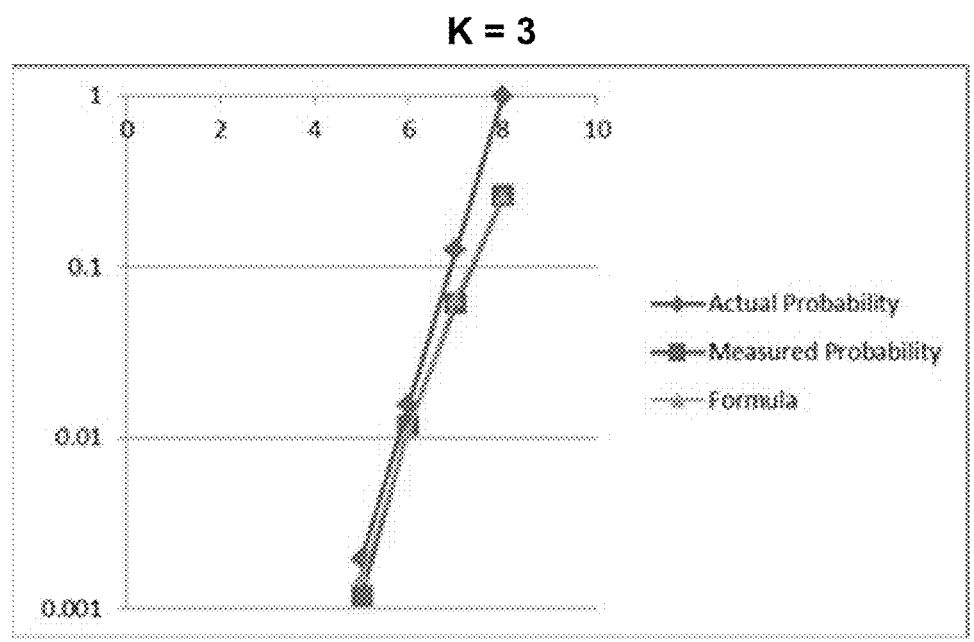

FIGS. 5-7 depict simulation results of the probability of an iterated hash hit (square data marker) and the actual probability of solution set membership (diamond data marker) for k=1, 2, and 3 amplification iterations, respectively, using an iterated SHA-1 hash function, as a function of number of bits $\log_2(n)$ of solution set size. In some embodiments, other suitable hash functions can be used. The simulation results verify the correction formula (with the triangular data marker). Here the number of bits of hash value per iteration is $\log_2(m)=8$. Thus, a given probability error translates into a linearly decreasing solution set size estimation error, as a function of the number of iterations k. Yet the quantum circuit size grows only logarithmically with the number of iterations k (to hold more hash bits).

Figure 8:
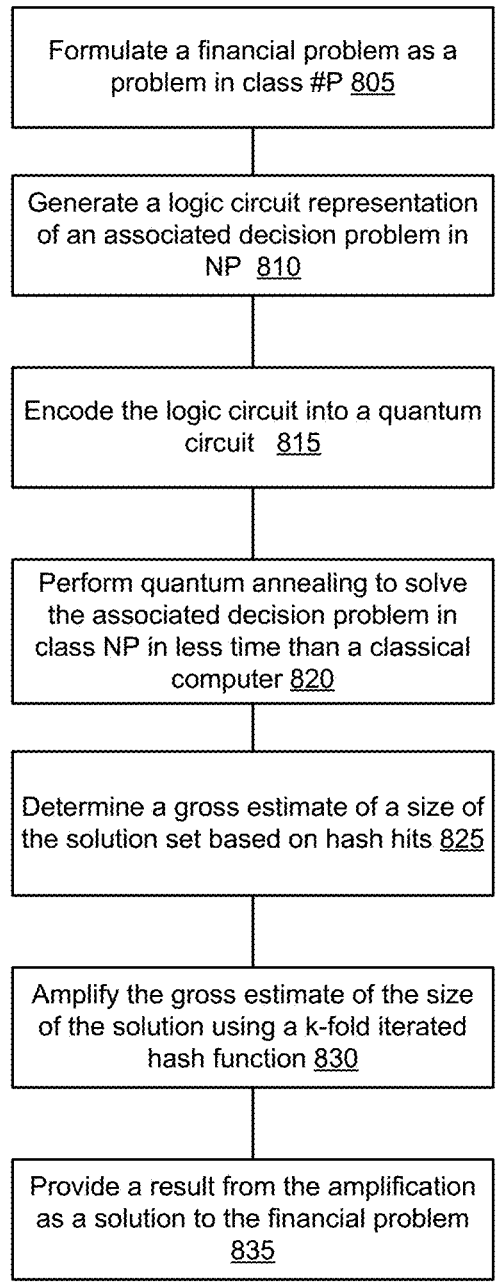
FIG. 8 is a logic flow diagram illustrating an example method of solving a financial problem using a quantum computer.

FIG. 8 is a logic flow diagram illustrating an example method of solving a financial problem using a quantum computer. In some embodiments, a financial problem can be formulated as a problem in # P at block 805. The problems in # P count the number of solutions to decision problems in NP. For example, for financial problems related to capital calculations, the # P problem can be counting x such that $f(x)<c$. By way of another example, for financial problems relating to pricing calculations, the # P problem can be dividing $y=f(x)$ into small intervals and counting how many x fall into each interval, which would give the probability distribution of y, and therefore the average.

At block 810, the a logic circuit representation of an associated decision problem in NP can be generated. The logic circuit representation can include one or more logic functions. In some embodiments, the logic circuit representation can be generated using a classical computer system. At block 815, the logic circuit representation of the NP problem is encoded into a quantum circuit of the quantum solver. The encoding of the binary logic functions can be based on quadratic energies, and can be performed using a classical computer system. At block 820, quantum annealing method is used by the quantum solver to solve the NP problem in less time than a classical computer system. At block 825, the quantum solver can determine a gross estimate of a size of the solution set based on hash hits. The quantum solver can use a hash function that has a random salt added to it to look for solutions that match specific hash values. At block 830, the quantum solver can amplify the gross estimate of the size of the solution set using a k-fold iterated hash function. At block 835, the result from the amplification can be provided as a solution to the financial problem.

Figure 9:
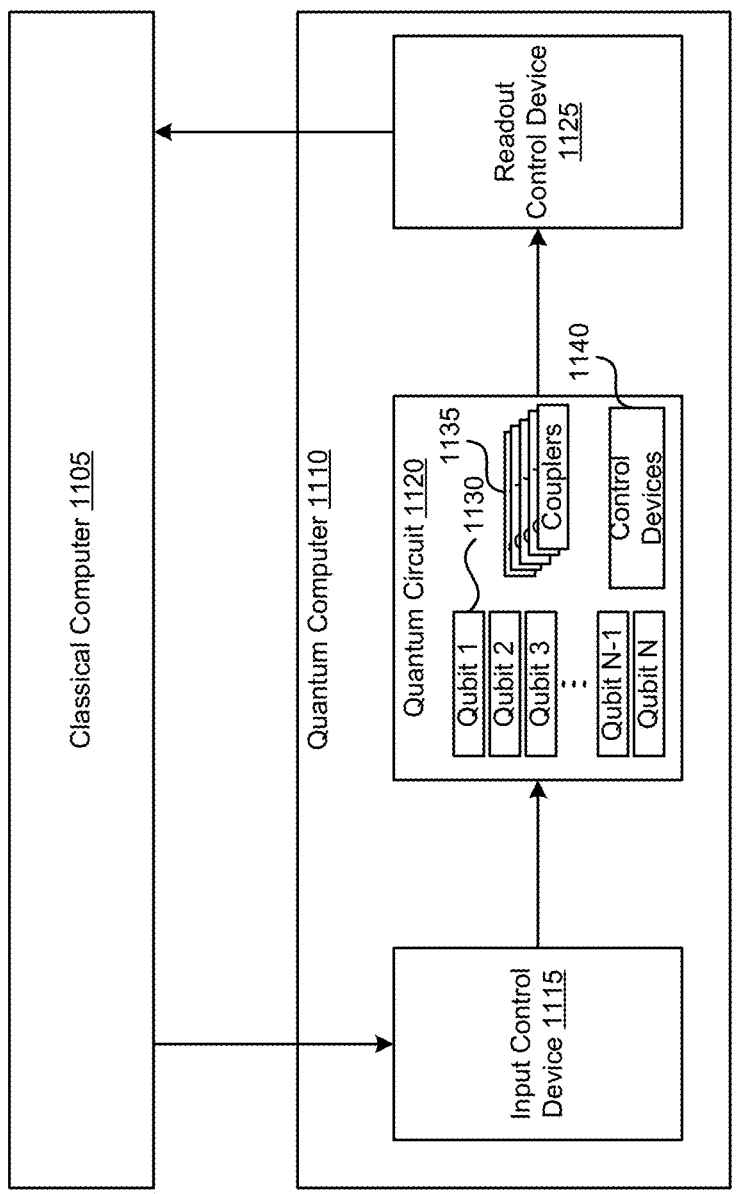
FIG. 9 is a block diagram illustrating a quantum computer coupled to a classical computer.

FIG. 9 is a block diagram illustrating a quantum computer system coupled to a classical computer system. The quantum solver can be implemented on a quantum computation system 1110 that includes a quantum circuit 1120. In some embodiments, the quantum circuit 1120 can include qubits 1130 (e.g., qubits 1-N) and couplers 1135 that provide connectivity between the qubits 1130. The quantum circuit 1120 can also include control devices 1140 that can produce magnetic field to affect the nearby qubits. In some embodiments, the quantum computer can include an input control device 115 and readout control device 1125 that facilitate input/output communication between the quantum computer 1110 and the classical computer system 1105. For example, the readout control device 1125 can facilitate read out of the qubits after they have settled down to the lowest energy states.

In some embodiments, the pre- and/or post-processing can be handled by components of the classical computer system 1105, while the quantum computer system 1110 handles the actual solving of the NP problem. The classical computer system 1105 is a machine including a set of instructions stored in the memory, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer system, and that, when read and executed by one or more processing units or processors in a computer system, cause the computer system to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method of solving a problem in a set of problems (# P class) that count a number of a set of solutions to an associated problem in a non-deterministic polynomial time (NP) class on a quantum circuit, comprising:
    counting the number of the solutions to the associated problem in the NP class to solve the problem in the # P class by:
        constructing a quantum circuit having ground states that comprise a set of candidate solutions to the associated problem in the NP class;
        using a quantum annealing process to find one of the ground states, if it exists, as an associated solution to the associated problem in the NP class, wherein the associated problem in the NP class solves the problem in the # P class and achieves a specific random hash value;
        determining a gross estimate of a size of the set of the solutions by searching hash hits for a hash hit solution that has the specific random hash value generated from a hash function;
        amplifying the gross estimate of the size of the set of the solutions using a k-fold iterated hash function in which a number of bits of the specific random hash value increases linearly with each iteration; and
        providing the amplified gross estimate as a solution to the problem in the # P class.

2. The method of claim 1, wherein the problem in the # P class is solved on the quantum circuit in a time less than that taken by a classical computer.

3. The method of claim 1, further comprising:
reducing a financial calculation problem to the problem in the # P class to solve the financial calculation problem on the quantum circuit.

4. The method of claim 3, wherein the financial calculation problem is a problem in a capital calculation class, pricing calculation class or American pricing calculation class of financial calculation problems.

5. The method of claim 3, wherein the financial calculation problem is a problem of finding a $p^{th}$ percentile gain or loss function f(x) over exponentially many scenarios x.

6. The method of claim 5, wherein the financial calculation problem is reduced to the problem in the # P class that includes counting a number of x for which the function f(x) is less than c.

7. The method of claim 3, wherein the financial calculation problem is a problem of finding an average discounted payoff function f(x) over exponentially many scenarios x.

8. The method of claim 7, wherein the financial calculation problem is reduced to the problem in the # P class that includes counting (x, y) for which y is less than the function f(x), where the function f(x) takes as input non-negative integers y with d bits.

9. The method of claim 3, wherein the financial calculation problem is a problem of finding an expected payoff function p( ) where $p(X_1, \ldots, X_k) = f(X_1, \ldots, X_k;$ average $\{X_{\{k+1\}}\}\ p(X_1, \ldots, X_{\{5+1\}}))$ for some functions f over scenarios $x = (X_1, \ldots, X_{k+1})$.

10. The method of claim 9, wherein the financial calculation problem is reduced to the problem in the # P class that includes counting the solutions to functions $p(X_1, \ldots, X_{\{k+1\}})\ p_i(X_1, \ldots, X_k)$ and $p_i(X_1, \ldots, X_k)\ p_i(X_1, \ldots, X_k)$ over the scenarios $X = (X_1, \ldots, X_{\{+1\}})$.

11. The method of claim 1, wherein the hash function has a random salt added to it.

12. The method of claim 11, wherein searching for the hash hit solution optimizes efficiency in use of the quantum circuit of a given size, wherein a probability of a non-hit is approximately equal to exp(−n/m), where n is an actual size of the set of the solutions and m is a number of distinct hash values.

13. The method of claim 12, wherein the number of distinct hash values is comparable to the actual size of the set of the solutions to resolve a hit from a non-hit of the specific random hash value.

14. The method of claim 13, further comprising:
averaging a hash hit value in a set {O,1} over a small number of samples to obtain a 0(1) bound on an estimate of an actual probability of the hash hit value being the hash hit solution.

15. The method of claim 14, further comprising:
applying a correction term to the actual probability as n approaches m.

16. The method of claim 15, wherein a probability q of an iterated hash hit is given in terms of an actual probability p of being the hash hit solution by $q = p - (1-(2/\pi)^k) * p^{(1.5/k0.2)}$.

17. The method of claim 1, wherein estimation error decreases linearly with a number of iterations from the amplification.

18. The method of claim 1, wherein the amplification allows a size of the quantum circuit to grow logarithmically with a number of iterations.

19. A method of solving a problem in a set of problems (# P class) that count a number of a set of solutions to an associated problem in a non-deterministic polynomial time (NP) class using a quantum computer, comprising:
determining a gross estimate of a size of the set of the solutions to the associated problem in the NP class that the problem in the # P class is counting by identifying hash hit solutions that achieve specific hash values generated from a hash hit function including searching for hash hits, wherein the problem in the NP class solves the problem in the # P class and achieves a specific random hash value;
amplifying the gross estimate of the size of the set of the solutions using a k-fold iterated hash function in which a number of bits of the specific random hash value increases linearly with each iteration; and
providing the amplified gross estimate as a solution to the problem in the # P class.

20. The method of claim 19, wherein with each iteration, as a result of the amplification, estimation error is reduced linearly.

21. The method of claim 19, wherein the quantum computer includes a quantum circuit of a given size whose ground states comprise candidate solutions to the problem in the NP class that achieve the specific random hash value.

22. The method of claim 21, wherein the quantum computer uses a quantum annealing process to find one of those ground states if it exists.

23. The method of claim 21, wherein the size of the quantum circuit grows logarithmically with a number of iterations used in the amplification.

24. The method of claim 19, further comprising:
rephrasing a financial calculation problem into the problem in the # P class to solve the financial calculation problem using the quantum computer.

25. The method of claim 19, wherein the problem in the # P class is a financial calculation problem that is rephrased for solving using the quantum computer.

26. The method of claim 25, wherein the financial calculation problem is one of a capital calculation problem or a pricing calculation problem.

27. The method of claim 26, wherein the capital calculation problem includes finding a $p^{th}$ percentile gain or loss of a function over exponential scenarios.

28. The method of claim 26, wherein the pricing calculation problem includes finding an average discounted payoff function over exponential scenarios.

29. A quantum computer for solving a problem in a set of problems (# P class) that count a number of a set of solutions to an associated problem in a non-deterministic polynomial time (NP) class, comprising:
an n-qubit quantum circuit having ground states that comprise a set of candidate solutions to the associated problem in the NP class, wherein the associated problem in the NP class includes the number of the solutions that the problem in the # P class is counting and achieves a specific random hash value;
wherein the n-qubit quantum circuit is configured to:
perform quantum annealing to find one of the ground states, if it exists, as a solution to the associated problem in the NP class,
determine a gross estimate of a size of the set of the solutions by searching hash hits for a hash hit solution that has the specific random hash value generated from a hash function;
amplify the gross estimate of the size of the set of the solutions using a k-fold iterated hash function in which a number of bits of the specific random hash value increases linearly with each iteration; and
provide the amplified gross estimate as a solution to the problem in the # P class.

30. The quantum computer of claim 29, wherein the problem in the # P class is solved on the n-qubit quantum circuit in a time less than that taken by a classical computer.

31. The quantum computer of claim 29, wherein the problem in the # P class includes a financial calculation problem rephrased for solving on the n-qubit quantum circuit.

32. The quantum computer of claim 31, wherein the financial calculation problem is a problem in a capital calculation class, pricing calculation class or American pricing calculation class of financial calculation problems.

33. The quantum computer of claim 32, wherein the financial calculation problem is a problem of finding a $p^{th}$ percentile gain or loss function f(x) over exponentially many scenarios x.

34. The quantum computer of claim 32, wherein the financial calculation problem is a problem of finding an average discounted payoff function f(x) over exponentially many scenarios x.

35. The quantum computer of claim 29, wherein the hash function has a random salt added to it.

36. The quantum computer of claim 35, wherein estimation error decreases linearly with a number of iterations from the amplification.

* * * * *